(12) United States Patent
Jang et al.

(10) Patent No.: US 7,136,202 B2
(45) Date of Patent: Nov. 14, 2006

(54) APPARATUS FOR FEEDING DOCUMENTS IN A FACSIMILE

(75) Inventors: Deok-Hwan Jang, Suwon (KR);
Heon-Soo Park, Sungnam (KR);
Do-Hyung Kweon, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 936 days.

(21) Appl. No.: 10/105,378

(22) Filed: Mar. 26, 2002

(65) Prior Publication Data

US 2003/0002083 A1 Jan. 2, 2003

(30) Foreign Application Priority Data

Jun. 14, 2001 (KR) ............................... 2001-33342

(51) Int. Cl.
*H04N 1/04* (2006.01)
(52) U.S. Cl. ...................... 358/474; 358/400; 358/497; 358/498; 271/10.04; 271/114; 399/367
(58) Field of Classification Search ................ 358/498, 358/400, 497, 496; 271/10.04, 114, 10.09; 399/367
See application file for complete search history.

(56) References Cited

U.S. PATENT DOCUMENTS

| 5,291,242 A | * | 3/1994 | Takano ....................... 399/119 |
| 5,601,281 A | * | 2/1997 | Kubodera et al. ....... 271/10.04 |
| 5,956,152 A | * | 9/1999 | Yamada et al. ............. 358/412 |

* cited by examiner

*Primary Examiner*—Douglas Q. Tran
*Assistant Examiner*—Negussie Worku
(74) *Attorney, Agent, or Firm*—Robert E. Bushnell, Esq.

(57) ABSTRACT

An apparatus for feeding documents in a facsimile includes a pickup roller for picking up documents one by one, a white roller that faces a read module and rotates, the read module for reading data from the documents transferred by the pickup roller, a discharge roller for discharging the documents after the documents are passed through the white roller and the read module, a driving unit, a power transmission mechanism for selectively transmitting a power of the driving unit either only to the pickup roller, or to all of the pickup roller, the white roller and the discharge roller simultaneously, and a controller for controlling the power transmission mechanism to selectively transmit the power either one of the pickup roller, the white roller, and the discharge roller.

29 Claims, 5 Drawing Sheets

APPARATUS FOR FEEDING DOCUMENTS IN A FACSIMILE

CLAIM OF PRIORITY

This application makes reference to, incorporates the same herein, and claims all benefits accruing under 35 U.S.C. §119 from an application for DOCUMENT SENDING APPARATUS FOR FACSIMILE earlier filed in the Korean Industrial Property Office on 14 Jun. 2001, and there duly assigned Serial No. 33342/2001 by that Office.

BACKGROUND OF THE INVENTION

1. Field of the Invention

The present invention relates to a document feeding apparatus in a facsimile, and more particularly to a document feeding apparatus having a plurality of rollers and gears disposed to selectively rotate for feeding documents along a scanning path without being misaligned with the scanning path.

2. Description of the Related Art

A document feeding mechanism used in a facsimile having a scanning unit and a printing unit includes a pickup roller, a feeding roller, and a discarding roller. When a document is placed on a cassette, the document is picked up by the pickup roller, transferred to a reading module along a feeding path by the feeding roller, and discharged by the discharging roller outside the document feeding mechanism after the document has been read by the reading module or misaligned with the feeding path. However, once the document is neither properly placed on the cassette nor precisely picked up by the pickup roller, the document may be deformed or torn. Then the document feeding mechanism might stall, and the reading module cannot read the document accurately.

SUMMARY OF THE INVENTION

It is an object of the present invention to provide an apparatus for feeding a document in a facsimile having an improved document feeding structure for compensating misalignment of the document before the document is transferred to a read module.

It is another object to provide an apparatus for feeding documents in a facsimile having an improved document feeding structure capable of consecutively discharging a plurality of documents and at the same time compensating for the misalignment of the documents before the document is transferred to the read module.

These and other object of the present invention may be achieved by providing an improved document feeding apparatus adapted for use in a facsimile. The document feeding apparatus includes a pickup roller for picking up a document placed on a cassette, a white roller disposed to face a read module and feed the picked-up document so as for the read module to read data from the it document, a discharge roller for discharging the document outside the document feeding apparatus after the document is passed through the feeding path formed between the white roller and the read module, a driving unit, a power transmission mechanism selectively transmitting rotating power of the driving unit either only to the pickup roller or to all of the pickup roller, the white roller and the discharge roller simultaneously, and a controller for controlling the power transmission mechanism to transmit the rotation power only to the pickup roller when the document is picked up from the cassette, the controller controlling the power transmission mechanism to transmit the rotation power to all of the pickup roller, the white roller, and the discharge roller when the document picked up by the pickup roller is disposed in the feeding path.

The power transmission mechanism includes a driving gear connected with the driving unit, a first gear train engaged with the white roller and the discharge roller, a second gear train engaged with the pickup roller, a first swing gear for transmitting a power to the first gear train or to the second gear train by idling in accordance with a rotational direction of the driving gear, and a second swing gear that idles in accordance with the rotational direction of the driving gear in order to transmit the power to the second gear train while the first swing gear is connected with the first gear train.

The power transmission mechanism includes an idle gear connected with the driving gear and transmitting the power of the driving gear to the first and second swing gears, and a swing arm rotatably supported by the idle gear for rotatably supporting the first and second swing gears at both ends.

The first gear train includes a first gear connected with a discharge roller gear of the discharge roller, and a second gear for connecting the first gear and a white roller gear of the white roller, the second gear selectively connected with the first swing gear.

The second gear train includes a third gear connected with a gear of the pickup roller, and selectively connected with the first swing gear, and a fourth gear drivingly connected with the third gear, and selectively connected with the second swing gear.

The document feeding apparatus in a facsimile includes a pickup roller for picking up a document from a cassette, a white roller that faces a read module which reads data from the document picked-up by the pickup roller while the white roller rotates, a discharge roller for discharging the document outside the document feeding apparatus after the document is passed through the white roller and the read module, a driving unit, a power transmission mechanism selectively transmitting power of the driving unit either only to the pickup roller and the discharge roller or to all of the pickup roller, the white roller and the discharge roller simultaneously, and a controller controlling the power transmission mechanism to transmit the power only to the pickup roller and the discharge roller when the document is picked up, the controller controlling the power transmission mechanism to transmit the power all of the pickup roller, the white roller, and the discharge roller when the document picked up by the pickup roller reaches the white roller.

The power transmission mechanism includes a first gear train for connecting a pickup roller gear and a discharge roller gear, a second gear train connected with the first gear train, a third gear train drivingly geared with a white roller gear, a driving gear connected with the driving unit, and a swing gear unit for stopping only the rotation of the white roller by selectively transmitting the power of the driving unit to the first gear train in accordance with a rotational direction of the driving unit or for rotating simultaneously the three rollers by selectively transmitting the power to the second gear train and the third gear train at the same time.

The swing gear unit includes a first swing gear for rotating in the rotational direction of the driving unit and transmitting power by being selectively connected with the first or the second gear train, a second swing gear for transmitting the power by being selectively connected with the second gear train idling in a rotational direction of the driving unit, an idle gear for transmitting the power of the driving unit to each swing gear, and a swing arm for rotatably supporting each swing gear, and for being rotatably coupled to the idle gear.

At least two gears contained in the first gear train are coaxially coupled with gears of the third gear train, and the coaxially coupled gears of the first and second gear trains independently rotate.

The first gear train includes an integrated first gear having a minor gear connected with a pickup roller gear and a major gear being greater than the minor gear in diameter and rotating with the minor gear coaxially and simultaneously, a second gear connected with the major gear of the first gear, and a third, a fourth, and a fifth gears engaged with each other and drivingly connected between the second gear and discharge roller, sequentially, at least one among the third, the fourth, and the fifth gears coaxially coupled with the gear of the third gear train, and the coaxially coupled gears rotating independently from each other.

The second gear train includes a first idle gear connected with the major gear of the first gear, and a second idle gear connected with the first idle gear and selectively connected to the first swing gear by the swing gear unit.

The third gear train includes a sixth gear disposed coaxially on the fourth gear of the first gear train, the sixth gear and the fourth gear independently rotating and receiving the power from the driving gear by being selectively connected with the swing gear unit, and a seventh gear engaged with the sixth gear and a white roller gear and coaxially connected with the third gear of the first gear train, and the seventh gear and the third gear independently rotate.

BRIEF DESCRIPTION OF THE DRAWINGS

A more complete appreciation of the present invention, and many of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
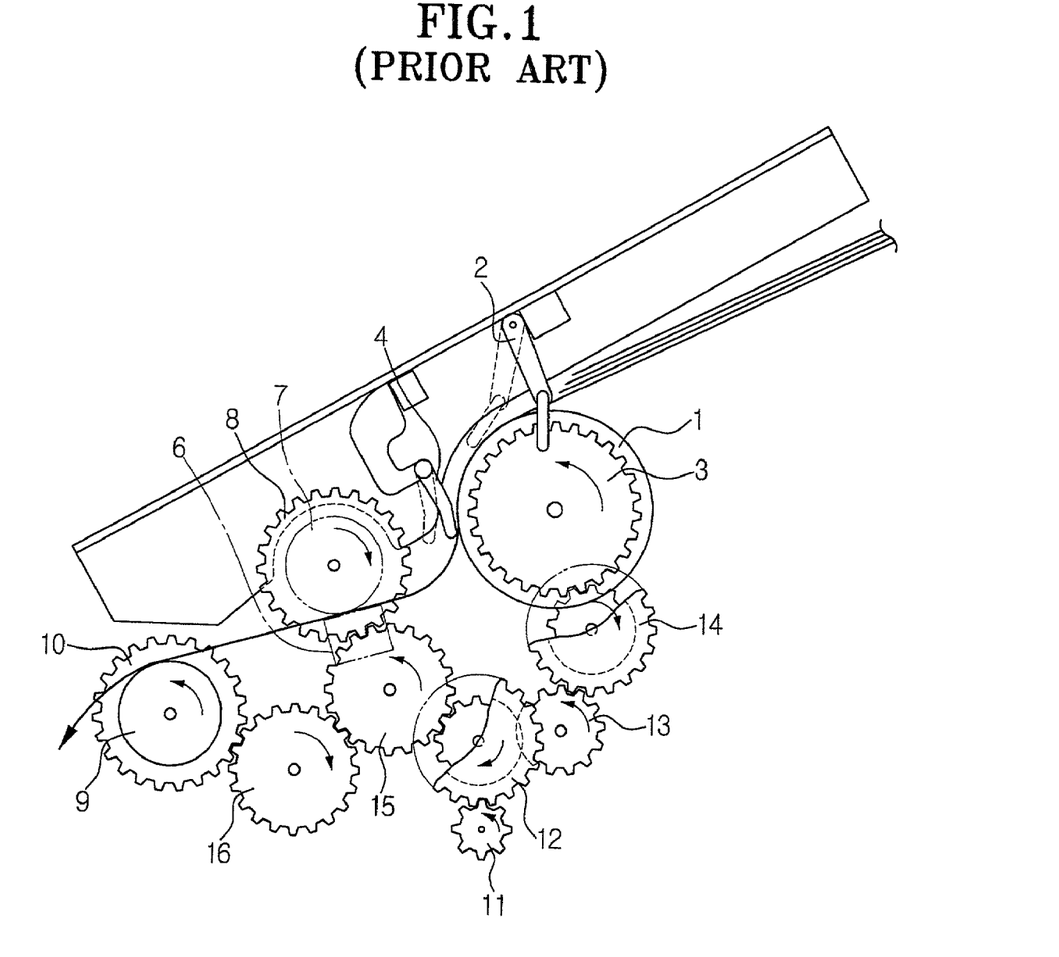
FIG. 1 is a schematic view showing a conventional apparatus for feeding documents in a facsimile.

As shown in FIG. 1, a scanning unit includes a pickup roller 1 for separating documents one by one from a cassette, a document sensor 2 for sensing a picked-up document, a pickup roller gear 3 for transmitting power to pickup roller 1, a scan position sensor 4 for detecting the entrance of the picked-up document, a read module 6 for reading data from the document in response to scan position sensor 4, a white roller 7 for maintaining a constant feeding speed and pressure on the document against read module 6 when the document is read, a white roller gear 8 for transmitting power to white roller 7, and a discharge roller 9 for discharging the document outside the scanning unit after the document has been read by read module 6 and a discarding roller gear 10 for transmitting power to discharging roller 9. Each gear 3, 8, or 10 is driven by the power transmitted through gear trains 12, 13, 14, 15 and 16 which are driven by a driving gear 11, which is connected with a motor (not shown).

When a document is placed on a cassette having a document feeder in a sending facsimile, a user inputs a telephone number of a receiving facsimile. If the sending and receiving facsimiles are connected through a telecommunication line, the pickup roller 1 picks up documents one by one in response to a start command signal. A picked-up document is consecutively sensed by sensors 2 and 4. In response to each signal generated from sensors 2 and 4, read module 6 reads data from the documents that pass through white roller 7 along a feeding path. Continuously, white roller 7 transfers the read documents to discharge roller 9. Discharge roller 9 discharges the documents outside the system.

However, when the document is picked up and transferred into the scanning unit, the document may be misaligned with the feeding path due to a mechanical problem or due to a user's mistake. Therefore, pickup roller 1 shakes, and pickup roller 1 and white roller 7 are not aligned with each other along the feeding path. In this case, the document transferred to read module 6 is misaligned and deviated from the feeding path. The document may be deformed by friction force between read module 6 and white roller 7. Then, data read from the document becomes incorrect, and the incomplete data is transmitted to the receiving facsimile. It is disadvantage that the document is deformed and that the data may not be read correctly from the deformed document.

Figure 2:
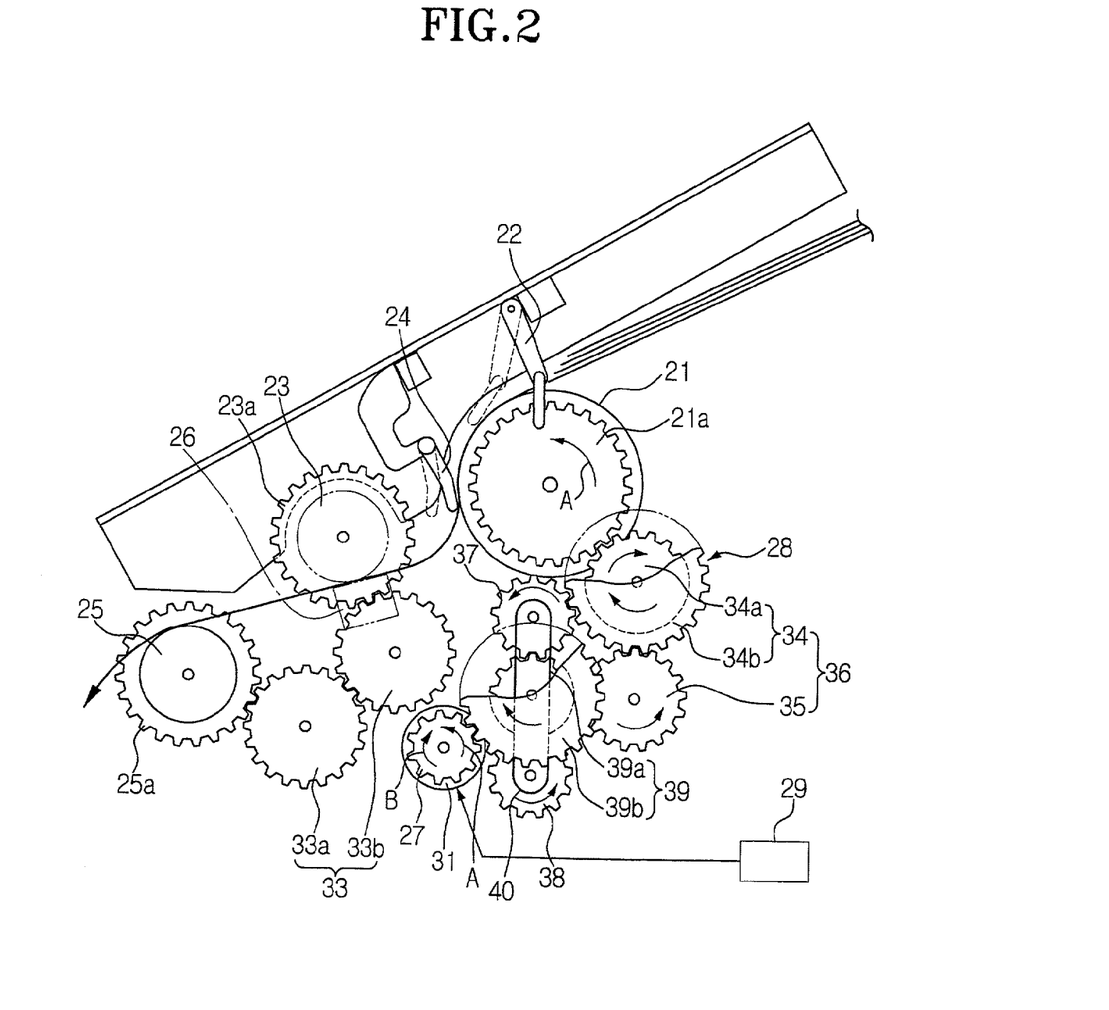
FIGS. 2 and 3 are schematic block diagrams showing an apparatus for feeding documents in a facsimile constructed according to the principles of the present invention.

FIG. 2 shows an apparatus for feeding documents in a facsimile including a pickup roller for picking up documents one by one, a white roller 23, a discharge roller 25, a driving unit 31, a power transmission mechanism 28, and a controller 29.

Each roller 21, 23, and 25 is disposed in order on a transfer passage of the documents. Pickup roller 21 rotates by power transmitted from driving unit 31 through a pickup roller gear 21a.

A document sensor 22 is disposed in a proximity of pickup roller 21. Document sensor 22 senses the entrance of the document picked up by pickup roller 21. In addition, a scan position sensor 24 is installed between pickup roller 21 and white roller 23. Scan position sensor 24 senses the entrance of the document. Signals generated from sensors 22 and 24 are transmitted to controller 29. In response to the signal from sensors 22 and 24, the document is ready to be read or scanned in a predetermined period of time after the document is sensed by sensors 22 and 24.

White roller 23 is disposed at a lower part of scan position sensor 24. White roller 23 is installed to face a read module 26 for reading data from the document. Read module 26 reads data from the document in accordance with a driving signal of the controller 29. White roller 23 rotates by the power from driving unit 31 through a white roller gear 23a that is coaxially coupled with white roller 23.

Discharge roller 25 discharges the document which has passed through white roller 23 and the read module 26 outside a document reading system. Discharge roller 25 rotates by the power from driving unit 31 through a discharge roller gear 25a that is coaxially coupled with discharge roller 25.

Power transmission mechanism 28 may either transfer the power of driving unit 31 only to pickup roller 21 or simultaneously transfer the power of driving unit 31 to each roller 21, 23, and 25. Power transmission mechanism 28 is controlled by controller 29. In other words, power transmission mechanism 28 is controlled to transfer the power only to pickup roller 21 until a front end of the document picked up by pickup roller 21 contacts white roller 23. Accordingly, even if the document enters being misaligned, the front end of the document is aligned with the transfer passage by white roller 23 since the document is advanced toward white roller 23 for a predetermined period of time by pickup roller 21. When the document is aligned, power transmission mechanism 28 simultaneously transmits the power to rollers 21, 23, and 25 and rotates rollers 21, 23, and 25 simultaneously. Therefore, a pickup and discharge operation of the documents is performed at the same time.

Power transmission mechanism 28 includes a driving gear 27 connected with driving unit 31, a first gear train 33 for drivingly connecting white roller 23 and discharge roller 25, a second gear train 36 connected with pickup roller 21, a first swing gear 37, a second swing gear 38, an idle gear 39, and a swing arm 40.

First gear train 33 includes a first gear 33a for rotating in connection with discharge roller gear 25a, and a second gear 33b for driving first gear 33a and white roller gear 23a. Second gear 33b is selectively connected to first swing gear 37 when first swing gear 37 contacts second gear 33b of first gear train 33.

Second gear train 36 includes a third gear 34 drivingly connected with pickup roller gear 21a, and a fourth gear 35 drivingly connected with third gear 34. Third gear 34 includes a minor gear 34a engaged with pickup roller gear 21a, and a major gear 34b having a greater diameter than a minor gear 34a being coaxially coupled with major gear 34a. Minor gear 34a rotates together with major gear 34b. Major gear 34b is selectively connected with first swing gear 37 when first swing gear 37 is engaged with major gear 34b. Fourth gear 35 is engaged with major gear 34b and is selectively engaged with second swing gear 38 when being contact with second swing gear 38. Minor gear 34a and major gear 34b may be replaced by a single gear having a predetermined gear ratio for directly connecting pickup roller gear 21 to fourth gear 35.

Figure 3:
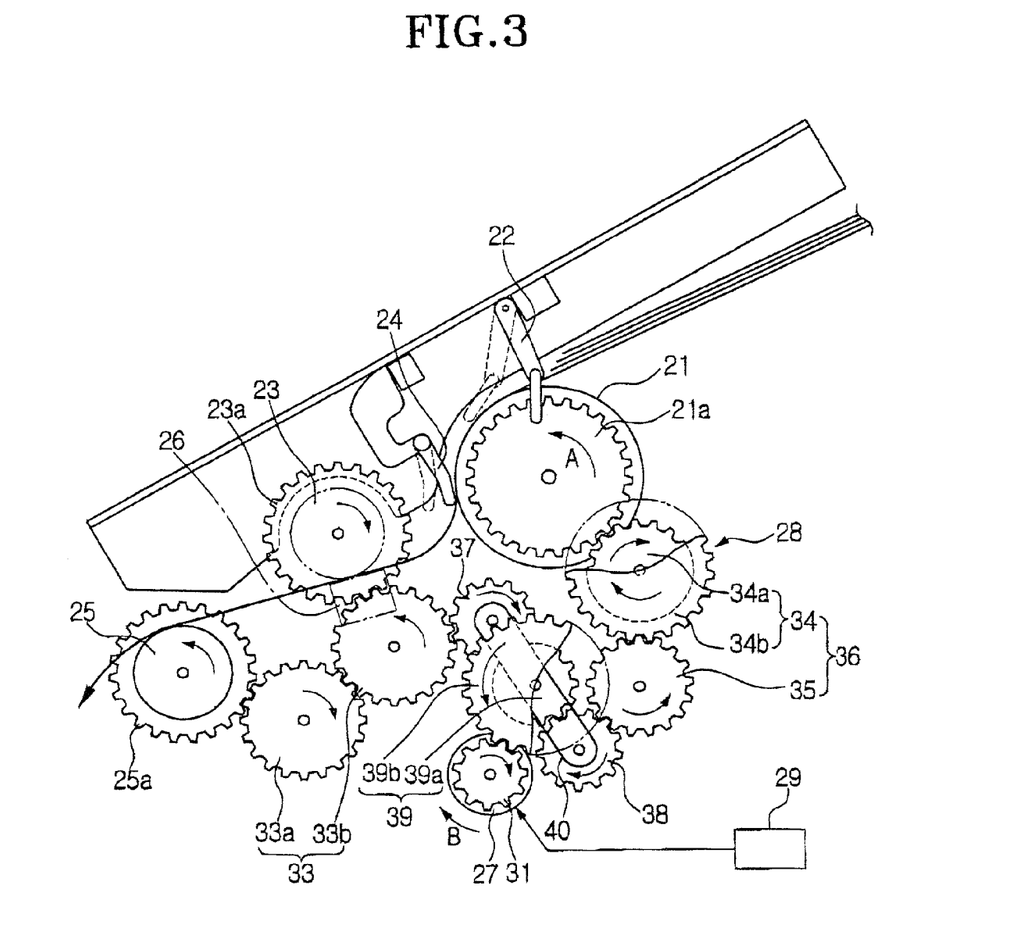

First swing gear 37 idles in accordance with a rotational direction of driving gear 27. First swing gear 37 rotates in a counter clockwise direction A as shown in FIG. 2 or in a clockwise direction B as shown in FIG. 3. First swing gear 37 transmits the power to first gear train 33 or to second gear train 36. More specifically, first swing gear 37 is selectively engaged with second gear 33b or to major gear 34b in accordance with the rotation direction of driving gear 27.

Second swing gear 38 idles in accordance with the rotation direction of the driving gear 27. Second swing gear 38 is selectively connected with and separated from second gear train 36 in accordance with an idling direction of second swing gear 38. Second swing gear 38 is connected with fourth gear 35 when first swing gear 37 is connected with second gear 33b. Second swing gear 38 is separated from fourth gear 35, when first swing gear 37 is connected with major gear 34b.

Idle gear 39 simultaneously transmits the power of driving gear 27 to first and second swing gears 37 and 38. Idle gear 39 includes a minor gear 39a disposed between first and second swing gears 37 and 38 to transmit the power to each of first and second swing gears 37 and 38, and a major gear 39b coaxially coupled with a minor gear 39a to rotate together with minor gear 39a. Major gear 39b rotates by driving gear 27.

A swing arm 40 is rotatably disposed at idle gear 39. More specifically, it is preferable that swing arm 40 rotates about an axis passing through a center of minor gear 39a and major gear 39b. In addition, swing arm 40 has an axile coaxially coupled with major and minor gears 39a and 39b. Moreover, each of first and second swing gears 37 and 38 are rotatably supported at both ends of swing arm 40 while rotating by minor gear 39b.

From now on, the operation of the apparatus for feeding documents in a facsimile constructed according to the principles of the present invention is described in greater detail as follows.

First of all, as shown in FIG. 2, a user sets up the document on the cassette, when first swing gear 37 is connected with major gear 34b of third gear 34. Then, the user selects a start button when the sending facsimile is connected with the receiving facsimile. After that, driving unit 31 is driven by controller 29 to rotate driving gear 27 in an "A" direction. Next, the power of driving gear 27 is transmitted to pickup roller gear 21 a of pickup roller 21 through idle gear 39, first swing gear 37, and third gear 34. Therefore, pickup roller 21 rotates to the "A" direction by the power transmitted to pickup roller gear 21a. At this time, second swing gear 38 idles.

On the other hand, pickup roller 21 picks up documents one by one, and a document enters the transfer passage of the facsimile. Document sensor 22 generates a first sensing signal to controller 29 after sensing the entrance of the document. In addition, scan position sensor 24 continuously senses the entered document and generates a second sensing signal representing information about a read position of the document to controller 29. In response to the second sensing signal from sensor 24, driving gear 27 is rotated in the "A" direction for a predetermined period of time. Then, the document picked up enters the transfer passage but cannot advance its way due to a friction force between white roller 23 and read module 26. In other words, since white roller 23 and discharge roller 25 are stopped, the document stalls between white roller 23 and read module 26. At this time, even if the document is entered and conveyed as it is misaligned, the document is stopped on the transfer passage when the front end of the document contacts the white roller 23. Meanwhile, the rest of the document is continuously forced to be advanced toward white roller 23 by pickup roller 21. Accordingly, the document can be aligned properly in line with the transfer passage.

Controller 29 controls driving gear 27 to rotate only for a predetermined period of time after receiving the signal from the sensor 24. After the predetermined period of time, controller 29 drives driving unit 31 in a "B" direction. Then, driving gear 27 is rotated in the "B" direction. Moreover, each swing gears 37 and 38 connected with idle gear 39 rotate in the "B" direction, and the swing arm 40 rotates in the "A" direction about idle gear 39. As shown in FIG. 3, first swing gear 37 is separated from third gear 34, and connected with second gear 33b. In addition, second swing gear 38 is connected with fourth gear 35. Therefore, white roller 23 is rotated by the power transmitted through first swing gear 37, second gear 33b, and white roller gear 23a. Moreover, discharge roller 25 is rotated by the power transmitted through second swing gear 37, second gear 33b, first gear 33a, and discharge roller gear 25a.

Furthermore, pickup roller 21 is rotated by the power transmitted through second swing gear 38, fourth gear 35, third gear 34, and pickup roller gear 21a. Pickup roller 21 rotates regardless of the position of the documents. In other words, as shown in FIG. 2, pickup roller 21 is rotated by the power transmitted from first swing gear 37 when pickup roller 21 picks up the document. As shown in FIG. 3, pickup roller 21 is rotated by the power transmitted from second swing gear 38 when the data on the documents is read by read module 26 and when the documents are transferred by white roller 23. White roller 23 and discharge roller 25 are rotated only after the documents are aligned. Thus, the aligned documents pass through read module 26 by a rotation force of white roller 23. At this time, read module 26 reads the data from the documents. Then, the documents are discharged outside the document reading apparatus through discharge roller 25 after being read by read module 26

As described above, the documents are aligned with the transfer passage and transferred by driving gear 31 in the "A" direction and the "B" direction repeatedly. Thus, even if the documents are picked up being misaligned with the transfer passage, the misaligned documents are compensated to be aligned with the transfer passage before being transferred to read module 26. Accordingly, it can be prevented that the incorrect and distorted data is transferred to the receiving facsimile.

Figure 4:
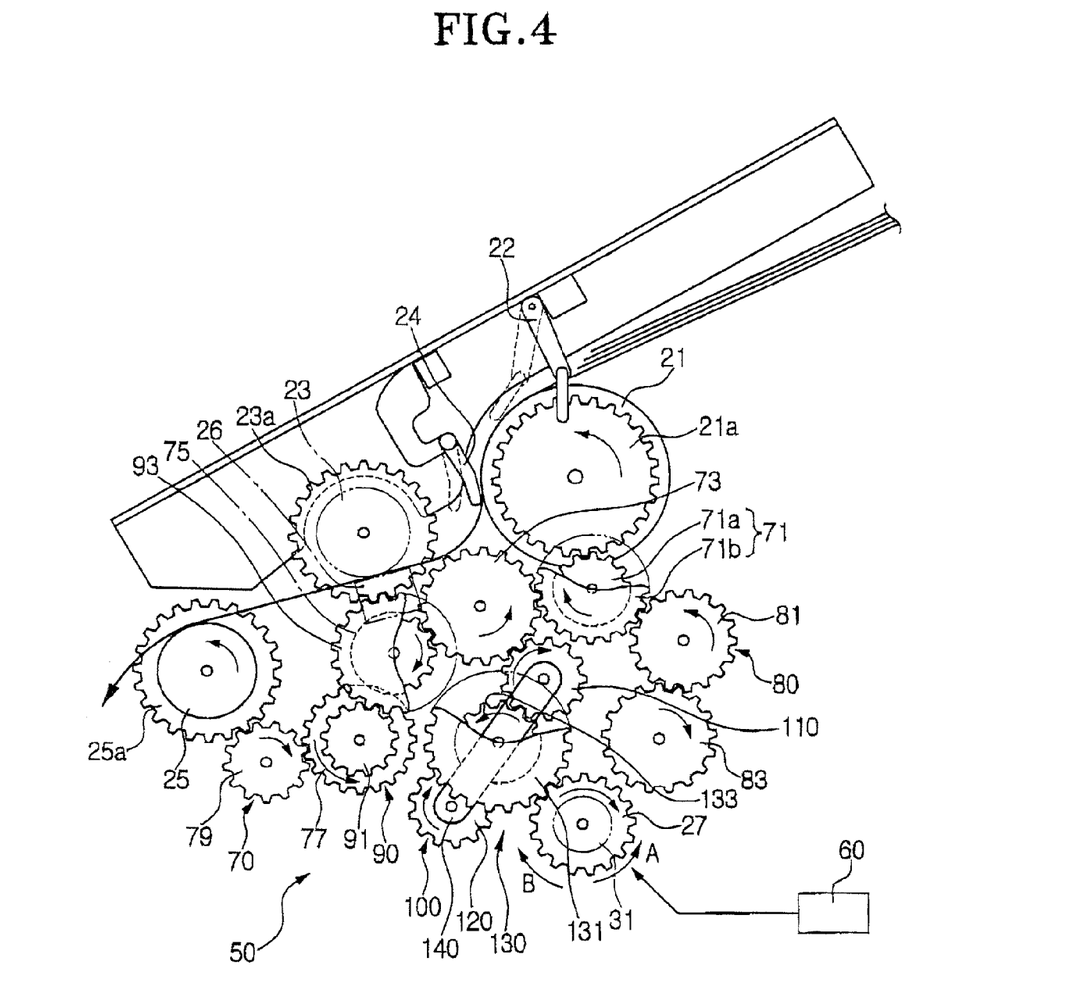
FIGS. 4 and 5 are schematic block diagrams showing an apparatus for feeding documents in a facsimile of a second embodiment of the present invention.

Referring to FIG. 4, an apparatus for feeding documents in a facsimile constructed according to a second embodiment of the present invention includes a pickup roller 21, a white roller 23, a discharge roller 25, a driving unit 31, a power transmission mechanism 50, and a controller 60. Here, the same reference numerals are given to the components identical to the components of FIG. 2. Thus, detailed description about the same components will be omitted.

Power transmission mechanism 50 simultaneously transmits the power of driving unit 31 either only to pickup roller 21 and discharge roller 25, or all of the pickup roller 21, white roller 23, and discharge roller 35. Power transmission mechanism 50 is controlled by controller 60.

Power transmission mechanism 50 includes a first gear train 70, a second gear train 80, a third gear train 90, a driving gear 27, and a swing gear unit 100.

First gear train 70 is drivingly connected between a pickup roller gear 21a and a discharge roller gear 25a. First gear train 70 includes a first gear 71 connected with pickup roller gear 21a, a second gear 73 connected with first gear 71, a third gear 75, a fourth gear 77, and a fifth gear 79.

First gear 71 includes a minor gear 71a engaged with pickup roller gear 21a, and a major gear 71b having a greater diameter than minor gear 71a. Each of major gears 71a and 71b are coaxially coupled and rotated together. Second gear 73 is engaged with major gear 71b and is selectively connected with swing gear unit 100. Third gear 75, fourth gear 77, and fifth gear 79 are drivingly engaged in order between second gear 73 and discharge roller gear 25a. In other words, fifth gear 79 is engaged with discharge roller gear 25a.

Second gear train 80 is engaged with first gear train 70. Second gear train 80 includes a first idle gear 81 engaged with major gear 71b, and a second idle gear 83 engaged with first idle gear 81. Second idle gear 83 is selectively connected with swing gear unit 100.

Third gear train 90 is connected with white roller gear 23a in order to selectively transmit the power of driving unit 31 to white roller 23. Third gear train 90 comprises a sixth gear 91 and a seventh gear 93. Sixth gear 91 is coaxially disposed with the fourth gear 77 of first gear train 70 and independently rotates from fourth gear 77. Moreover, sixth gear 91 receives the power by being selectively connected with swing gear unit 100. Seventh gear 93 is engaged with sixth gear 91 and white roller gear 23a. Seventh gear 93 is coaxially disposed with third gear 75 to independently rotate from third gear 75. Thus, seventh gear 93 transmits the power of sixth gear 91 to white roller gear 23a.

Swing gear unit 100 rotates only pickup roller 21 and discharge roller 25 by transmitting the power of driving unit 31 only to first gear train 70 in accordance with a rotational direction of driving unit 31, or rotates all of the pickup roller 21, white roller 23, and discharge roller 25 by transmitting the power to both second gear train 80 and third gear train 90 at the same time.

Swing gear unit 100 includes a first swing gear 110, a second swing gear 120, a third idle gear 130, and a swing arm 140. First swing gear 110 rotates in accordance with a rotational direction of driving gear 27 and is selectively connected with second gear 73 or second idle gear 83. Second swing gear 120 idles in accordance with the rotational direction of the driving gear 27 and is selectively connected with and separated from sixth gear 91. Therefore, white roller 23 rotates by the power transmitted only when second swing gear 120 is connected with sixth gear 91. Third idle gear 130 simultaneously transmits the power of driving gear 27 to swing gears 110 and 120. Third idle gear 130 includes a major idle gear 131 engaged with driving gear 27, and a minor idle gear 133 coaxially coupled to major gear 131. Minor gear 133 having a smaller diameter than the major gear 131 is coupled between first and second swing gears 110 and 120 to rotate together. In other words, major gear 131 and minor gear 133 simultaneously rotate and transmit the power to first and second swing gears 110 and 120 at the same time. Swing arm 140 is rotatably disposed at a rotation center of idle gear 130. More specifically, the swing arm 140 is installed between major gear 131 and minor gear 133. Each of first and second swing gears 110 and 120 are rotatably supported at both ends of swing arm 140.

An operation of an apparatus for feeding documents in a facsimile constructed according to the second embodiment of the present invention is described as follows.

As shown in FIG. 4, when first swing gear 110 is connected with second gear 73, the power of driving unit 31 is transmitted only to pickup roller 21 and discharge roller 25. In other words, if driving unit 31 is rotated in the "B" direction, pickup roller 21 is rotated by the power transmitted through driving gear 27, idle gear 130, first swing gear 110, first gear 71, and pickup roller gear 21a. Pickup roller 21 rotates to pick up the documents from the cassette one by one. The picked-up document passes through sensors 22 and 24 and stops a predetermined period of time when disposed to contact white roller 23 and read module 26. At this time, white roller 23 is stopped since third gear train 90 is separated from driving unit 31. Thus, a front end of the document is stopped by a friction force between white roller 23 and read module 26, and a rear portion of the document is faced to be advanced into the transfer passage by pickup roller 21. Accordingly, even if the document picked up is misaligned from the transfer passage, the document is forced to be aligned with the transfer passage as it is stopped by contacting white roller 23. Therefore, the misaligned of the document may be compensated to make the document to be aligned with the transfer passage.

On the other hand, after the document is passed through the sensor 24, and after the predetermined period of time lapses controller 60 control driving unit 31 to rotate in the "A" direction. Then, first and second swing gears 110 and 120 connected with idle gear 130 move with swing arm 140 by idling in the rotational direction of driving gear 27. In other words, when first swing gear 110 is separated from second gear 73 and connected to second idle gear 83, the power is of driving unit 31 is transmitted to first gear 71 through driving gear 27, idle gear 130, first swing gear 110, second idle gear 83, and first idle gear 81. The power transmitted to first gear 71 is transmitted to pickup roller 21 through pickup roller gear 21a, and to discharge roller gear 25a through second gear 73, third gear 75, fourth gear 77, and fifth gear 79.

Figure 5:
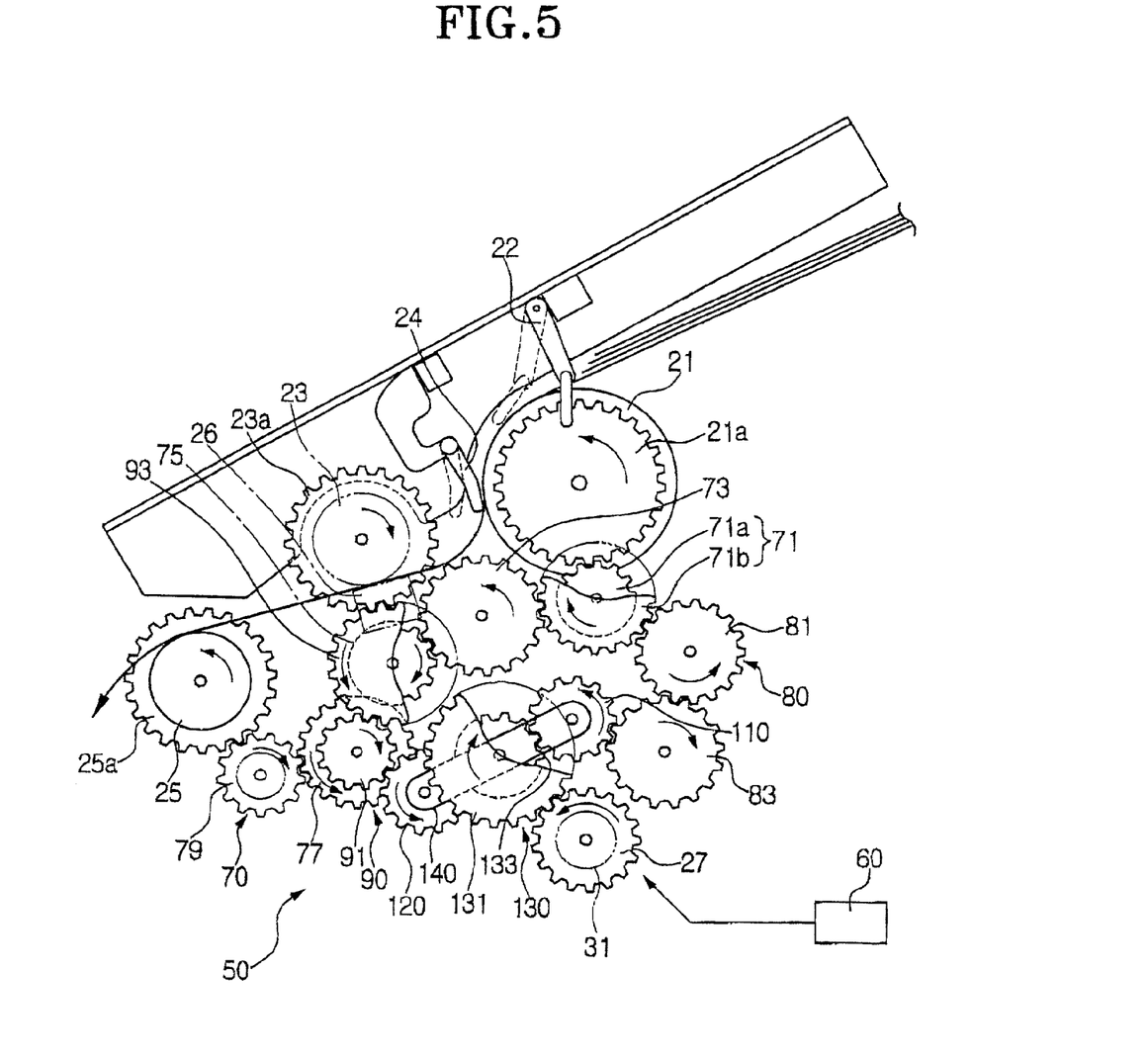

Moreover, second swing gear 120 is connected with sixth gear 91. Therefore, the power of driving unit 31 is transmitted to white roller 23 through driving gear 27, idle gear 130, second swing gear 120, sixth gear 91, seventh gear 93 and white roller gear 23a. Accordingly, all of the pickup roller 21, white roler23, and discharge roller 25 simultaneously rotate and transfer the documents as shown in FIG. 5. In other words, if the rotational direction of driving gear 27 is changed into the "A" direction or the "B" direction as shown in FIGS. 4 and 5, the misaligned document maybe compensated while passing through read module 26 by the rotation of white roller 23. Read module 26 may accurately read the data from the document passing therethrough. The document passing through white roller 23 is discharged outside the document reading system by discharge roller 25.

In the meantime, when the data on a plurality of documents is transmitted, the falling document is picked up consecutively before a previously picked-up document read by read module 26 is completely discharged. For this end, the controller 60 controls driving unit 31 to change the rotational direction of after the picked up document passes through white roller 23 and read module 26. Then, swing gear unit 100 returns to the position as shown in FIG. 4, and only pickup roller 21 and discharge roller 25 are rotated. In this status of swing gear unit 100 and driving unit 31, pickup roller 21 picks up a new document and feeds the document into the transfer passage formed between white roller 23 and read module 26, and discharge roller 25 discharges the document read by read module 26 outside the document reading system.

As described above, when a user wants to send data of a plurality of documents, the picking-up, the aligning, and the discharging of each document may be performed independently simultaneously. Accordingly, it can be prevented that the document to be read is deformed and that the discharged documents are overlapped and shuffled without being stacked in order, and thus the credibility of the product is improved.

According to the apparatus for feeding documents in a facsimile, discharge roller 25 and white roller 23 may be selectively driven and stopped by rotating the pickup roller 21. Therefore, even if the document misaligned from the transfer passage is picked up, the misaligned document may be corrected and the credibility of the sending data to be sent from the sending facsimile to the receiving facsimile is improved.

What is claimed is:

1. An apparatus for feeding documents in a facsimile, comprising;
   a pickup roller for picking up a document and transferring said document along a path;
   a read module for reading said document disposed in said path;
   a white roller disposed to receive said document transferred from said pickup roller and feed said document along said path formed between said white roller and said read module facing said white roller;
   a discharge roller disposed to receive said document fed from said white roller and said read module along said path, discharging said document outside said apparatus after said document is fed by said read module;
   a driving unit;
   a power transmission mechanism selectively driven by said driving unit to transmit power of driving unit only to said pickup roller, or to all of said pickup roller, said white roller and said discharge roller simultaneously; and
   a controller for controlling said power transmission mechanism to be connected either only to said pickup roller or all of said pickup roller, said white roller, and said discharge roller.

2. The apparatus of claim 1, said power transmission mechanism comprising:
   a driving gear connected to said driving unit;
   a first gear train being engaged with said white roller and said discharge roller;
   a second gear train being engaged with pickup roller;
   a first swing gear for coupling said driving unit to either one of said first gear train and said second gear train when said driving gear rotates in a first direction; and
   a second swing gear for coupling said driving unit only to said second gear train when said driving gear rotates in a second direction.

3. The apparatus of claim 2, said power transmission mechanism comprising:
   an idle gear connected to said driving gear and transmitting the power of said driving gear to said first and second swing gears; and
   a swing arm rotatably supported by said idle gear for rotatably supporting said first and second swing gears at both ends.

4. The apparatus of claim 3, said first gear train comprising:
   a first gear connected to a discharge roller gear of said discharge roller; and
   a second gear for connecting said first gear and white roller gear of said white roller, selectively connected to said first swing gear.

5. The apparatus of claim 4, said second gear train comprising:
   a third gear connected with a pickup roller gear of said pickup roller, and selectively connected to said first swing gear; and
   a fourth gear drivingly connected with said third gear, and selectively connected to said second swing gear.

6. The apparatus of claim 2, said first gear train comprising:
   a first gear connected with a discharge roller gear of said discharge roller; and
   a second gear connected between said first gear and a white roller gear of said white roller, selectively connected to said first swing gear to rotate either one of said first gear train and said second gear train.

7. The apparatus of claim 2, said second gear train comprising:
   a third gear connected to a pickup roller gear of said pickup roller, and selectively connected to said first swing gear; and
   a fourth gear drivingly connected to said third gear, and selectively connected to said second swing gear.

8. An apparatus for feeding documents in a facsimile, comprising:
   a pickup roller for picking up documents;
   a read module disposed adjacent to said pickup roller to read the document fed from said pickup roller;

a white roller disposed to face said read module and feeding the document to pass through said read module;

a discharge roller disposed adjacent to said white roller to discharge the document outside said apparatus after the document is passed through said white roller and said read module;

a driving unit;

a power transmission mechanism selectively driven by said driving unit to connect said driving unit either only to said pickup roller and said discharge roller except said white roller, or to all of said pickup roller, said white roller and said discharge roller simultaneously; and a controller coupled to said driving unit for controlling said driving unit to allow said power transmission mechanism to connected either only to said pickup roller and discharge roller or all of said pickup roller, said white roller, and said discharge roller.

9. The apparatus of claim 8, said power transmission mechanism comprising:

a first gear train for drivingly connecting said power transmission mechanism a pickup roller gear of said pickup roller and a discharge roller gear of said discharge roller;

a second gear train drivingly engaged with said first gear train;

a third gear train drivingly engaged with a white roller gear of said white roller;

a driving gear connected with said driving unit; and a swing gear unit coupled to said driving gear for stopping rotation of said white roller by selectively connecting said driving unit only to said first gear train in accordance with a first rotational direction of said driving unit, or for rotating simultaneously all of said pickup roller, said white roller, and said discharge roller by selectively coupling said driving unit to said second gear train and said third gear train at the same time.

10. The apparatus of claim 9, said swing gear unit comprising:

a first swing gear for selectively coupling said driving unit to said first or second gear trains, rotating in the rotational direction of the driving unit;

a second swing gear for selectively coupling said driving unit to said second gear train, idling while said first wing gear contacts one of said first and second gear trains;

an idle gear for selectively coupling said driving unit to each of said first and second swing gears; and a swing arm for rotatably supporting each of said first and second swing gears, rotatably disposed at the idle gear.

11. The apparatus of claim 9, wherein at least two gears contained in said first gear train are coaxially coupled with corresponding gears of said third gear train and rotate independently from said corresponding gears of said third gear train.

12. The apparatus of claim 9, said first gear train comprising:

a first gear having a minor gear connected with a pickup roller gear of said pickup roller and a major gear being greater than said minor gear in diameter, said major gear rotating with said minor gear coaxially and simultaneously;

a second gear connected with said major gear of said first gear; and a third, a fourth, and a fifth gears engaged with each other, drivingly connected between said second gear and a discharge roller gear of the discharge roller, sequentially, at least one of said third, said fourth, and said fifth gears coaxially coupled to a corresponding gear of said third gear train and rotating independently from said gear of said third gear train.

13. The apparatus of claim 12, said second gear train comprising:

a first idle gear connected with said major gear of said first gear; and a second idle gear connected to said first idle gear and selectively connected with said swing gear unit.

14. The apparatus of claim 12, said third gear train comprising:

a sixth gear disposed coaxially on said fourth gear of said first gear train, said sixth gear rotating independently from said fourth gear of said first gear train, and being selectively connected with said swing gear unit; and a seventh gear engaged with said sixth gear and a white roller gear of said white roller and coaxially disposed on said third gear of said first gear train, and rotating independently from said third gear of said first gear train.

15. A sheet feeding apparatus, comprising:

a pickup roller for picking-up a sheet from a cassette;

a white roller disposed to receive the sheet picked up by said pickup roller, feeding the sheet along a path;

a reading module disposed to face said white roller, reading the sheet while said white roller feeds the sheet along said path formed between said reading module and said white roller;

a driving unit having a rotation power source; and a transmission mechanism disposed between said driving unit and one of said pickup roller and said white roller to selectively couple said driving unit to one of said pickup roller and said white roller.

16. The apparatus of claim 15, further comprising a discharge roller disposed to receive the sheet fed from said white roller along said path, said transmission mechanism selectively coupling said driving unit to said discharging roller discharging outside said apparatus the sheet fed by said white roller along said path after said sheet is read by said reading module.

17. The apparatus of claim 15, further comprising a sensor disposed between said pickup roller and said white roller to generate a signal when the sheet is disposed between said pickup roller and said white roller, said white roller becoming coupled to said driving unit in response to said signal.

18. The apparatus of claim 15, said white roller being separated from said driving unit while said pickup roller is coupled to said driving unit to pick up the sheet.

19. The apparatus of claim 15, said white roller and said pickup roller both coupled to said driving unit when the sheet contacts said white roller after the sheet is picked up by said pickup roller coupled to said driving unit.

20. The apparatus of claim 15, said transmission mechanism exclusively coupling said driving unit only to said pickup roller when the sheet is picked up by said pickup roller.

21. The apparatus of claim 15, said transmission mechanism coupling said driving unit either to only said pickup roller or to both said pickup roller and said white roller.

22. The apparatus of claim 15, further comprising:

a discharge roller disposed to receive the sheet fed from said white roller along said path and to discharge the sheet outside said apparatus; and said transmission mechanism selectively coupling said driving unit to either said pickup roller and said discharge roller or all of said pickup roller, said white roller, and said discharge roller.

23. The apparatus of claim 15, further comprising:
a discharge roller disposed to receive the sheet fed from said white roller along said path and to discharge the sheet outside said apparatus; and
said transmission mechanism selectively coupling said driving unit to either said pickup roller or all of said pickup roller, said white roller, and said discharge roller.

24. The apparatus of claim 23, said power transmission mechanism comprising:
a first gear train for drivingly connecting said power transmission mechanism a pickup roller gear of said pickup roller and a discharge roller gear of said discharge roller;
a second gear train drivingly engaged with said first gear train;
a third gear train drivingly engaged with a white roller gear of said white roller;
a driving gear connected with said driving unit; and
a swing gear unit coupled to said driving gear for stopping rotation of said white roller by selectively connecting said driving unit only to said first gear train in accordance with a first rotational direction of said driving unit, or for rotating simultaneously all of said pickup roller, said white roller, and said discharge roller by selectively coupling said driving unit to said second gear train and said third gear train at the same time.

25. The apparatus of claim 24, said swing gear unit comprising:
a first swing gear for selectively coupling said driving unit to said first or second gear trains, rotating in the rotational direction of the driving unit;
a second swing gear for selectively coupling said driving unit to said second gear train, idling while said first wing gear contacts one of said first and second gear trains;
an idle gear for selectively coupling said driving unit to each of said first and second swing gears; and
a swing arm for rotatably supporting each of said first and second swing gears, rotatably disposed at the idle gear.

26. A process in a document feeding apparatus, comprising the steps of:
providing a pickup roller for picking-up a document from a cassette, a white roller disposed to receive the document picked up by said pickup roller and to feed the document along the path, and a reading module disposed to face said white roller and to read sheet while said document is fed along said path formed between said reading module and said white roller;
providing a driving unit having a rotational power source;
connecting said driving unit to said pickup roller when said document is picked-up; and
connecting said driving unit to said pickup roller and said white roller after said document is picked up by said pickup roller.

27. The process of claim 26, further comprising the steps of:
providing a discharge roller disposed to receive the document fed from said white roller along said path and discharge the document outside said apparatus; and
coupling said driving unit to said discharge roller when the document is picked-up.

28. The process of claim 27, further comprising the step of coupling said driving unit to said discharge roller and said pickup roller when the document is picked-up.

29. The process of claim 28, further comprising the step of coupling said driving unit to all of said pickup roller, said white roller, and said discharge roller when the document is read by said reading module.

* * * * *